US005655028A

United States Patent [19]
Soll et al.

[11] Patent Number: 5,655,028
[45] Date of Patent: Aug. 5, 1997

[54] DYNAMIC IMAGE ANALYSIS SYSTEM

[75] Inventors: David R. Soll; Edward R. Voss, both of Iowa City, Iowa

[73] Assignee: University of Iowa Research Foundation, Iowa City, Iowa

[21] Appl. No.: 522,528

[22] Filed: Sep. 5, 1995

Related U.S. Application Data

[63] Continuation of Ser. No. 355,096, Dec. 13, 1994, abandoned, which is a continuation of Ser. No. 213,470, Mar. 15, 1994, abandoned, which is a continuation of Ser. No. 814,624, Dec. 30, 1991, abandoned.

[51] Int. Cl.$^6$ .................................................. G06K 9/00
[52] U.S. Cl. .................................. 382/133; 382/100
[58] Field of Search ............................ 382/133, 214, 382/215, 107, 201, 128, 190, 100, 307; 345/24; 348/155, 169

[56] References Cited

U.S. PATENT DOCUMENTS

| | | | |
|---|---|---|---|
| 4,451,825 | 5/1984 | Hall et al. | 345/195 |
| 4,851,904 | 7/1989 | Miyazaki et al. | 358/108 |
| 5,134,472 | 7/1992 | Abe | 358/108 |

*Primary Examiner*—Yon J. Couso
*Attorney, Agent, or Firm*—Kent A. Herink; Brian J. Laurenzo; Michael C. Gilchrist

[57] ABSTRACT

Method and apparatus for dynamic analysis of images of a mobile object. An electronic signal corresponding to the images, for example, from a video camera, is input into a digitizer which identifies the coordinates of the periphery of the mobile object in each of the images. A digital processor processes the contour information and a computer controlled by a software program having image processing and graphics capabilities calculates a plurality of parameters representative of the shape and motion of the object. The output from the computer may be displayed in graphical representations tabular form, in the formation animations on a monitor, or in hard copy printouts of the tables, animations and other graphical representations.

3 Claims, 8 Drawing Sheets

Microfiche Appendix Included
(4 Microfiche, 388 Pages)

1. Video record of cell or organism
2. Feed video through auto or manual digitization
3. The coordinates of the edge of each moving cell or organism is stored in data files
4. Examine data on computer screen: print out data, or playback dynamic computer images Centroid Track

DYNAMIC IMAGE ANALYSIS SYSTEM

This application is a continuation of application Ser. No. 08/355,096, filed Dec. 13, 1994, now abandoned; which is a continuation of application Ser. No. 08/213,470, filed Mar. 15, 1994, now abandoned; which is a continuation of application Ser. No. 07/814,624, filed Dec. 30, 1991, now abandoned.

BACKGROUND OF THE INVENTION

The invention relates generally to motion analysis and, more specifically, to a computer-assisted two-dimensional system for analyzing the dynamic morphology of any moving object which is changing shape.

Motion analysis systems have been used to analyze the parameters of shape and motion of objects in a variety of diverse fields. For example, such systems have been used to analyze video recordings of the Challenger shuttle accident, to analyze cell movement and morphological change, to quantitate shape changes of the embryonic heart, to quantitate breast movement for reconstructive surgery, and to analyze human form and movement, particularly in the area of dance. Previously, information required to analyze such systems was gathered manually. For example, in analyzing embryonic heart action, a researcher would display an echocardiogram of the heart on a monitor and make measurements off the monitor using a scale or the like held up to the screen. Manual measurements are both limited and extremely time consuming.

Existing computer assisted motion analysis systems only follow centroid tracks of moving objects and do not compute dynamic morphology parameters, i.e., parameters related to changes in contour. Existing systems also are locked into real-time contour digitizers that are low in resolution and are designed to support no more than 30 frames per second.

A dynamic image analysis system is desired that can digitize contours of objects at a resolution of at least 512×512 pixels and is expandable to higher resolutions as high definition television (HDTV) equipment becomes available. The system would be expandable to frame rates higher than 30 frames per second and be able to compute a large number of parameters and create visual holistic displays that depict the changing morphology of objects under analysis. The system would incorporate an integrated image processing package.

The specification of the invention includes a microfiche appendix under 37 C.F.R. §1.96 of four (4) microfiche comprising a total of 388 frames. The appendix is a print out in object code of the computer software program which is a part of the invention.

SUMMARY OF THE INVENTION

The dynamic image analysis system analyzes one or more objects depicted as a succession of images. The images are supplied by a video camera, from a video cassette recorder (VCR) or video disc player, or input directly as 'PICT' files on Macintosh data cartridges. Three modes of input may be utilized. First, real time digitization is performed using a customized contour digitizer at a rate of up to 30 frames per second with 512×512 pixel resolution. The system is easily modified to accommodate higher frame rates and pixel resolution. The customized contour digitizer is contained in a separate, dedicated enclosure which is easily transportable. Digitized data generated by the customized contour digitizer is stored on a magnetic diskette for subsequent analysis by other parts of the system. Second, real time digitization is accomplished using a commercial frame grabber controlled by software of the system and having a resolution of 512×512 pixels and a maximum real-time frame rate of ten frames per second. Edge detection of objects in the images may be accomplished either by thresholding, multiple thresholding, or gradience. The software is easily modified to accommodate more advanced contour detection methods as they are developed. Image processing of the data may be done at a maximum frame rate of one frame per second. Third, data of the images can be input by manual digitization using the commercial frame grabber. The user of the system traces the contour directly on a computer screen using a mouse. The manual digitization input mode may also be used to supplement the other two input modes to allow the input of data that may not otherwise be detected under the real-time digitization modes.

With respect to all three modes of input, the result is a computer data file containing the (x,y) coordinates of the pixels along the contours of an image for each frame analyzed. From this file, more than 40 parameters are computed measuring centroid movement and shape change. Visual holistic displays are generated depicting several aspects of shape change over the entire range of frames. An extended set of graphic tools, including histograms, two dimensional and three dimensional cross plots, basic statistics, Fourier analysis, and so forth, is provided for the analysis of parameters. A database to store parameters is provided. The user may further define additional parameters using a calculator-like interface. The visual displays include animated differencing and stacking, as well as linear and circular wrapping. The user can select from over 60 modes for displaying such animations and the system includes image processing for enhancing (1) dynamic images put into the system for quantitative analysis, (2) images or animations put out by the system, and (3) static images scanned by the system.

An object of the present invention is to provide for the manual and automatic detection of contours at a resolution of at least 512×512 pixels and a frame rate of at least 30 frames per second of up to 50 objects in parallel.

Another object of the present invention is to provide a computer assisted motion analysis system wherein a video signal of images of the objects is input either into a customized contour digitizer or a commercial frame grabber and permits software image processing and other contour detection techniques to improve contour detection.

Yet another object of the invention is to provide a computer-assisted motion analysis system to perform and display path analysis of a moving object including the calculation of up to ten parameters analyzing centroid movement of the object and to compute at least 30 parameters of the dynamics morphology of objects moving and changing shape.

Still a further object of the invention is to produce animations and pictures which depict aspects of shape change over the entire period of analysis of the object or objects and to have several different analyses or animations displayed simultaneously.

Still another object of the invention is to provide a computer-assisted motion analysis system which permits the definition of customized parameters using a calculator-like interface and includes graphic tools for plotting the parameters including basic statistics, histograms, two dimensional and three dimensional cross plots, Fourier analysis, linear and quadratic regression, peak and trough detection, and so forth.

Yet a further object of the invention is to provide a motion analysis system which has the ability to image process either input or output from the system and which provides that image processed output can be rerouted back into the system for further analysis.

Another object of the computer-assisted motion analysis system is to provide an integrated and flexible user-friendly environment which fully utilizes the menu/window features of Macintosh computer systems allowing the user to make "lateral" decisions of how to analyze or display the data.

A further object of the invention is to provide a computer-assisted motion analysis system including a customized contour digitizer which may be physically separated from the electronic computer of the system and which stores digitized data for subsequent transmission to the electronic computer so that the easily portable customized contour digitizer may be transported separately for ease of use.

These and further objects of the invention will be made evident to one skilled in the art upon a review of the specification, drawings, and claims.

BRIEF DESCRIPTION OF THE DRAWINGS

FIGS. 8A–8C are diagrammatic illustrations of how a "difference picture" is generated wherein FIG. 8A illustrates the outline of a cell at 7.00 minutes and the subsequent outline of the same cell at 7.25 minutes, FIG. 8B illustrates the actual position of the initial cell outline in broken line and the subsequent cell outline in solid line, and FIG. 8B illustrates the final difference picture in which expansion areas are filled in black, contraction areas are hatched, and common areas are unfilled.

DETAILED DESCRIPTION OF A PREFERRED EMBODIMENT

Figure 1:
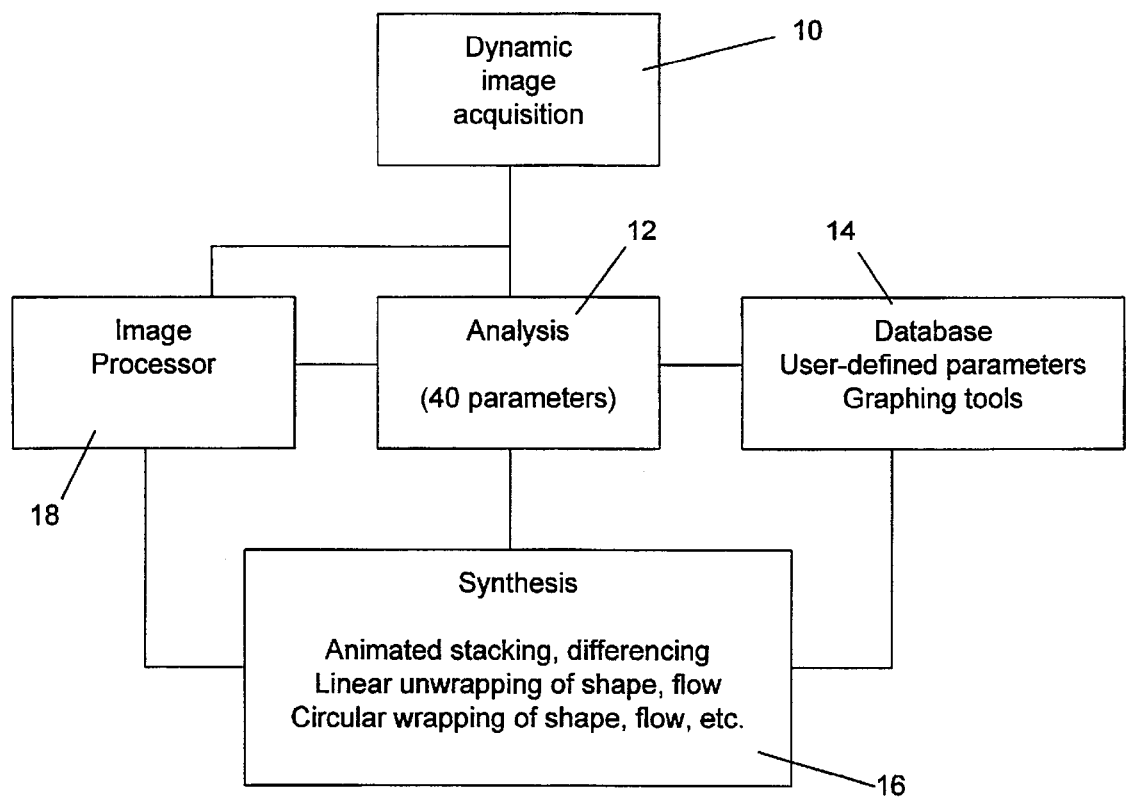
FIG. 1 is a block diagram of the present invention.

The fundamental structure of the present invention is illustrated in the block diagram of FIG. 1. Dynamic image acquisition 10 refers to the capture of successive images of a mobile object and conversion of the images into an electronic signal which is digitized to locate the outline or periphery of the mobile object. Analysis 12 is performed on the acquired data to calculate or generate up to 40 parameters of shape and changes in shape and motion of the mobile object between successive images. These parameters and the digitized representation of the mobile object are stored in a database 14. The capability of having user-defined parameters and a choice of visual graphic display modes is also represented by the database 14. The analysis 12 and database 14 interact with a synthesis 16 aspect of the invention which represents the manipulation of data, parameters, and the graphical representation of the mobile object. For example, the synthesis 16 represents the ability to do animated stacking of images, difference graphing, linear unwrapping of shape and flow, circular wrapping of shape and flow, and so forth.

An image processor 18 permits both manual and computer-assisted processing of the synthesized data for subsequent reanalysis to provide an opportunity for the user to enhance the performance of the invention in specific applications and to interact with the invention when necessary and appropriate.

Figure 2:
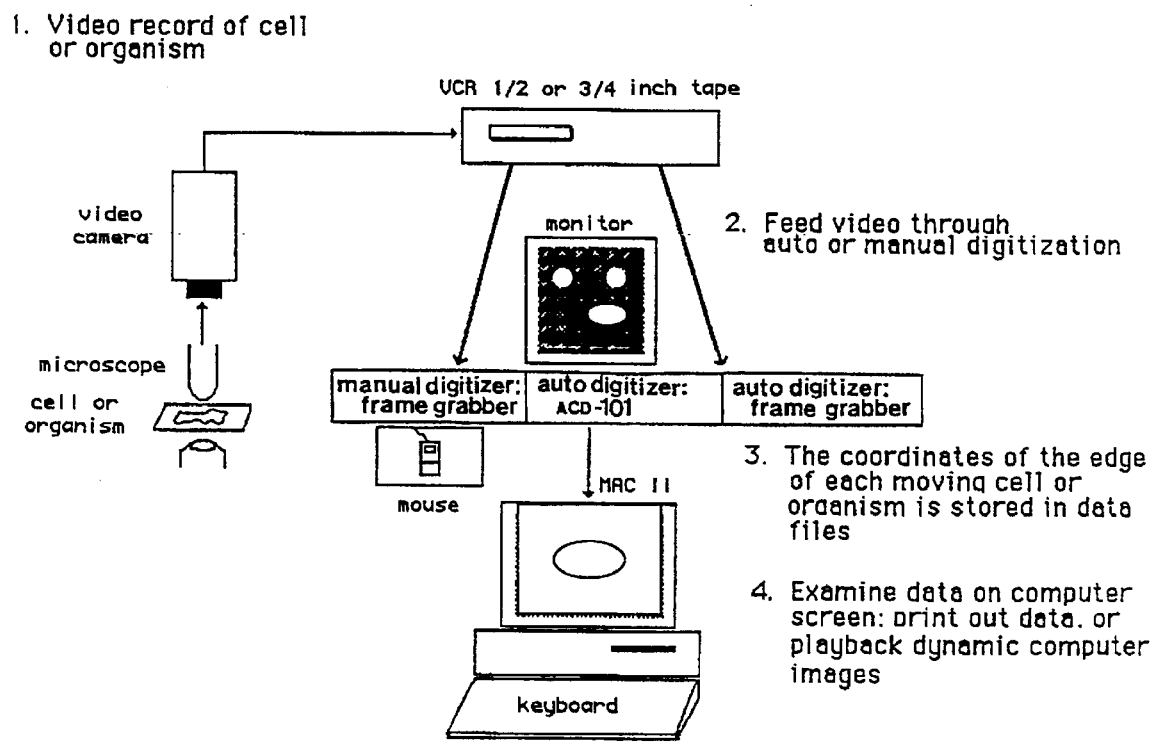
FIG. 2 is a schematic drawing of the apparatus of the present invention.

Apparatus of a preferred embodiment of the invention is represented schematically in FIG. 2. A cell or organism 20 is interposed between a light source 22 and a microscope 24. A video camera 26 views the cell 20 through the microscope 24 and records a succession of images of the cell 20 on a videocassette recorder 28. The images are displayed on a monitor 30. An automated digitizer, either a frame grabber 32 or a customized automated digitizer 34, receives electronic signals from the VCR 28 of the images of the cell 20, identifies the coordinates of the outline or periphery of the cell 20, and provides a digital representation of the outline or periphery for each of the frames or images of the cell 20. A manual digitizer 36 with accompanying mouse 38 is provided to permit the manual identification of the outline or periphery of the cell 20 by movement of a cursor on the monitor 30 and entry of the coordinates of the cell outline. The manual digitizer 36 is most commonly used when the image quality from the video camera 26 is insufficient for the accurate performance of the automated digitizers 32 and 34.

The digital representation of the cell outline for each of the images is fed into a computer 40 where it is stored in data files. The computer 40 includes a set of software commands which are used to generate up to 40 parameters of shape, changes in shape, and motion of the cell 20 between successive images or frames. The software utilized by the computer 40 also provides image processing capabilities that can be selected and manipulated by a user. The software further can be used to generate synthesized animations of the cell 20 for visual representation on a monitor of the computer 40 to improve the presentation of data and parameter information for absorption by a human user.

The microscope 24 and video camera 26 in combination provide an analog electrical signal that is a representation of the image of the cell 20 consisting of an array of picture element frames or pixels. Each pixel contains a value corresponding to the gray level of the image detected by the camera 26 at that point. In the preferred embodiment, the gray level value varies from 0 (black) to 255 (white). New frames are presented to the digitizers 34 at the standard video rate of 30 frames per second. Alternatively, the images detected by the camera 26 may be stored on a video cassette in the VCR 28 for subsequent replay into the digitizers 32, 34 or 36. If the tape is replayed at normal speed, frames will again be presented at the rate of 1/30th of a second. It is important to note, however, that the VCR may be placed in a pause mode or sequenced frame by frame to allow frames to be presented for processing at a slower rate.

The automatic digitizer may be either a customized integrated digitizer 34 developed by the inventors and identified by the name Automatic Contour Digitizer, Model 101 (ACD-101) or a commercial frame grabber 32 board such as the QuickCapture product of Data Translation. The ACD-101 integrated digitizer 34 is capable of processing video image frames at the rate of 1/30th of a second. On the other hand, the QuickCapture frame grabber requires approximately one-fifth second for processing an entire video screen.

The digitizer 32 uses one of three methods to determine the outline of the cell 20. Under the threshold method, all pixels under a preset threshold level are converted to black and all pixels above that level are converted to white. The outline is then taken to be any black pixel that has a white neighbor. In the multiple threshold method, a plurality of preset threshold levels are established for the determination of an outline for the object at the preset differentiation levels. Closed outlines of the mobile objects being viewed by the television camera are guaranteed by these threshold methods. The third alternative gradient method searches for pixels in which a next adjacent neighbor differs in gray level from the subject pixel by more than the gradient level. The gradient method does not always result in closed outlines, but will out-perform the threshold methods when the illumination of the image is uneven. Under the gradient method, the outline of the cell will have a gap where the image of the cell edge is blurred. Such gaps can be filled in by a user using the software on the computer 40.

Either method of digitization works best when the cell 20 or other mobile object is uniformly dark on a light background. The quality of the image can be adjusted by the gain or black level adjustment on the video camera 26 and by adjustment of the condenser and focus of the microscope 24. If image quality cannot be improved to a degree sufficient to allow for accurate identification of the outlines of the mobile object, the outlines can be traced by hand using the manual digitizer 36 and associated mouse 38.

A user of the invention will typically review the outline drawn by the automatic digitizers 32 and 34 and computer 40 and adjust the threshold values and perhaps settings of the microscope 24 and video camera 26 to obtain the optimum performance of the system. Once the initial conditions have been established, in most circumstances the system will accurately digitize and identify the boundaries of the mobile object within the video image.

The raw data generated by the digitizers 32, 34 and 36 is edited or manipulated by the computer 40 and its associated software. A user will select from a menu of 40 previously defined parameters those that are useful or appropriate to the particular mobile object and system being reviewed. Before discussing the specific parameters that are defined, it is important to note that all time series calculations performed by the dynamic image analysis system utilize the perimeter of the object defined by the x,y coordinates of perimeter pixels. The centroid, or center, of the object is calculated as the mathematical center of mass for the digitized object assuming uniform density.

Figure 3:
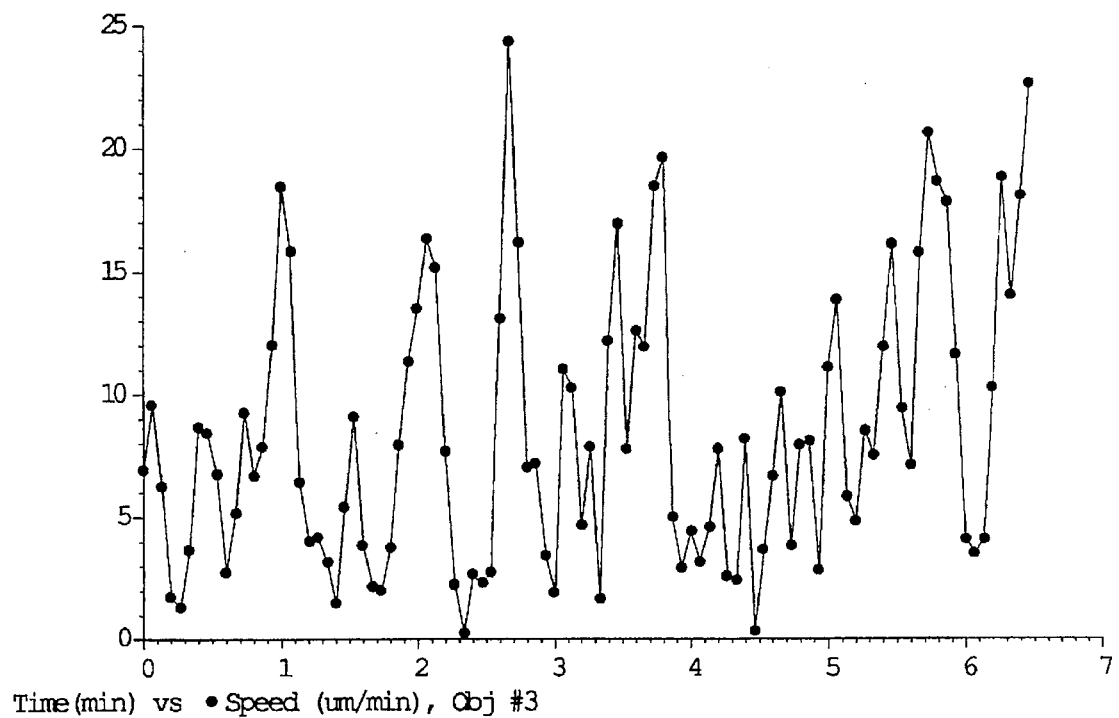
FIG. 3 illustrates a typical graphical representation of the output of the system showing a plot of the speed of a subject object over time and corresponding to the data presented in Table 1.

The predefined parameters supported by the system are described below:

Speed is the change in position of the centroid over time. The speed of the object may be smoothed by using a central difference method option or Tukey averaging (FIG. 3).

Direction is the direction of movement of the centroid of the object from a frame F to a frame F+1.

Figure 4:
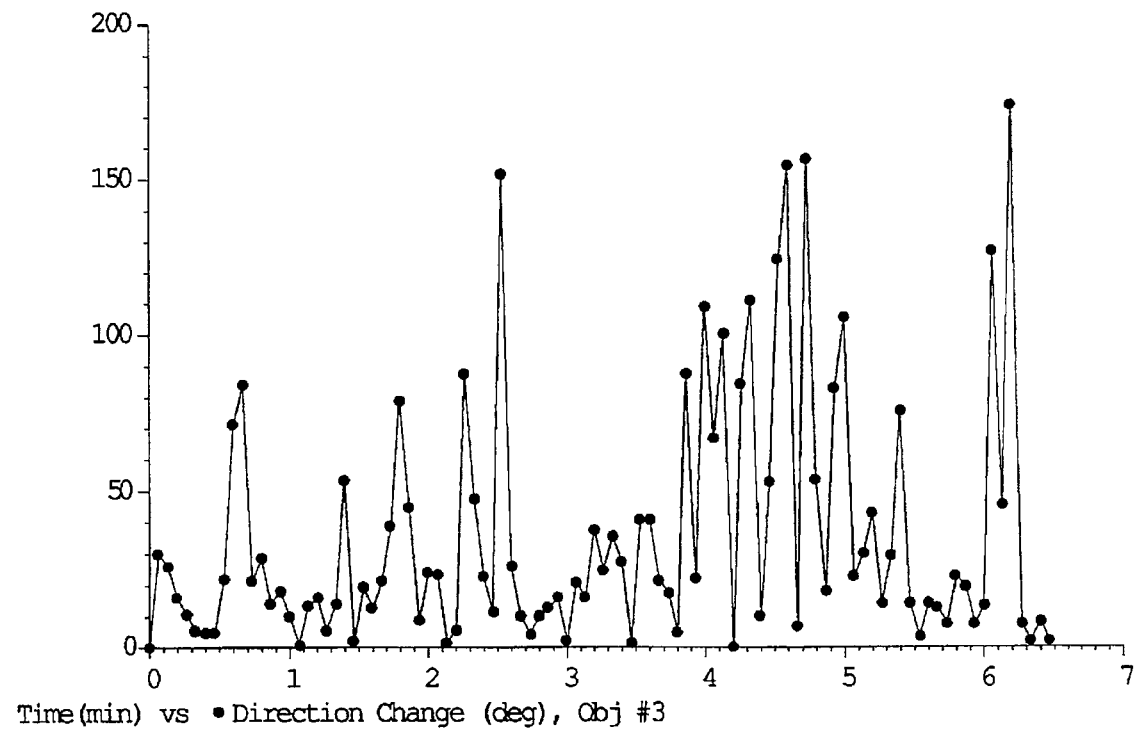
FIG. 4 illustrates a typical graphical representation of the output of the system showing a plot of change in direction of an object, in degrees, over time and corresponding to the data presented in Table 1.

Direction Change is the absolute value of the change in direction between frame F and frame F+1 (FIG. 4).

Acceleration is the change in speed from frame F to frame F+1 (note that the acceleration parameter can be smoothed by using the central difference method as well).

Persistence is the speed divided by the direction change in gradience. If the mobile object is not rotating, its persistence will be the same as its speed.

Figure 13:
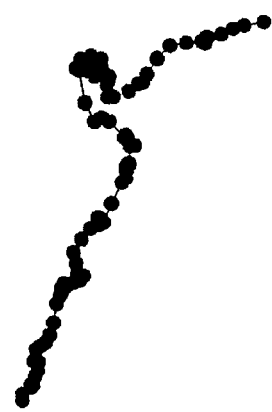
FIG. 13 is a graphical representation of the track of the centroid of the object analyzed by the system and represented in FIG. 12.

The X Centroid is the X coordinate of the centroid at a given frame F (See FIG. 13).

The Y Centroid is the Y coordinate of the centroid at a given frame F (See FIG. 13).

Axis Tilt is defined relative to the major axis of the mobile object. The axis tilt is the angle and degrees that major axis makes with the horizontal (it is always less than 180 degrees).

The Maximum Length of the mobile object is defined to be the length of the major axis of the object.

The Mean Width is the area divided by the maximum length.

The Maximum Width is defined to be the length of the longest chord (irrespective of whether it is partially outside the mobile object) perpendicular to the major axis.

Central Width is defined to be the length of the chord through the centroid (irrespective of whether it is partially outside the mobile object) perpendicular to the major axis.

The X Bounded Width is defined to be the width of the smallest enclosing rectangle with absolute horizontal and vertical sides.

The Y Bounded Width is defined to be the height of the smallest enclosing rectangle with absolute horizontal and vertical sides.

The X Slice Width is defined to be the length of the longest absolute horizontal chord irrespective of whether it is partially outside the object.

The Y Slice Width is defined to be the length of the longest absolute vertical chord irrespective of whether it is partially outside the object.

The Area is defined to be the area of the final shape of the mobile object minus the area of any holes that may have been detected in the object. The area is computed using Green's theorem.

The Perimeter is defined to be the perimeter of the final shape of the mobile object plus the perimeter of any holes detected in the mobile object.

Figure 5:
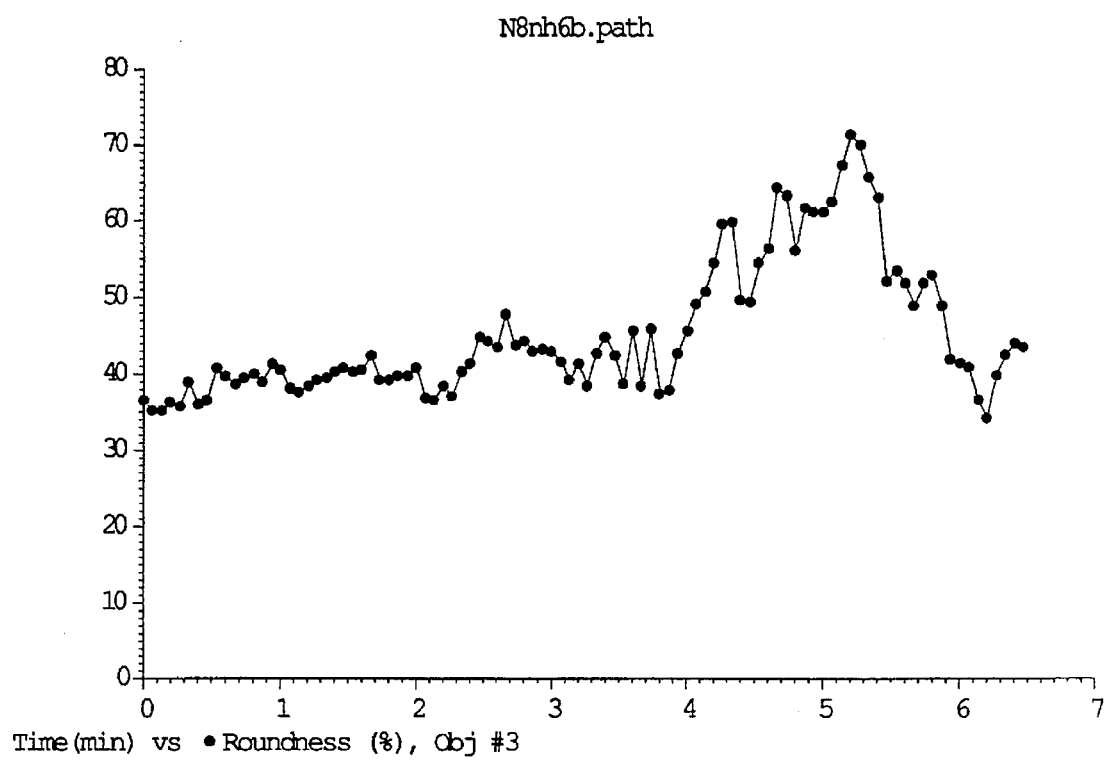
FIG. 5 illustrates a typical graphical representation of the output of the system showing a graph of the percentage roundness of the object analyzed by the system over time and corresponding to the data presented in Table 1.

The Roundness of the mobile object is defined to be the product of four pi times the area of the mobile object divided by the perimeter squared and is expressed in a percentage. The roundness is a measure of how efficiently a given amount of perimeter encloses area (FIG. 5).

The Predicted Volume is the volume of the ellipsoid with circular cross section having a length of the maximum length and a width of the mean width.

The Predicted Surface is defined to be the surface area of the ellipsoid with circular cross section having a length of the Maximum Length and a width of the mean width wherein an ellipticity correlation factor is used to approximate the surface area. Mean radial length is defined to be the average distance of boundary pixels of the mobile object to the centroid.

Figure 6:
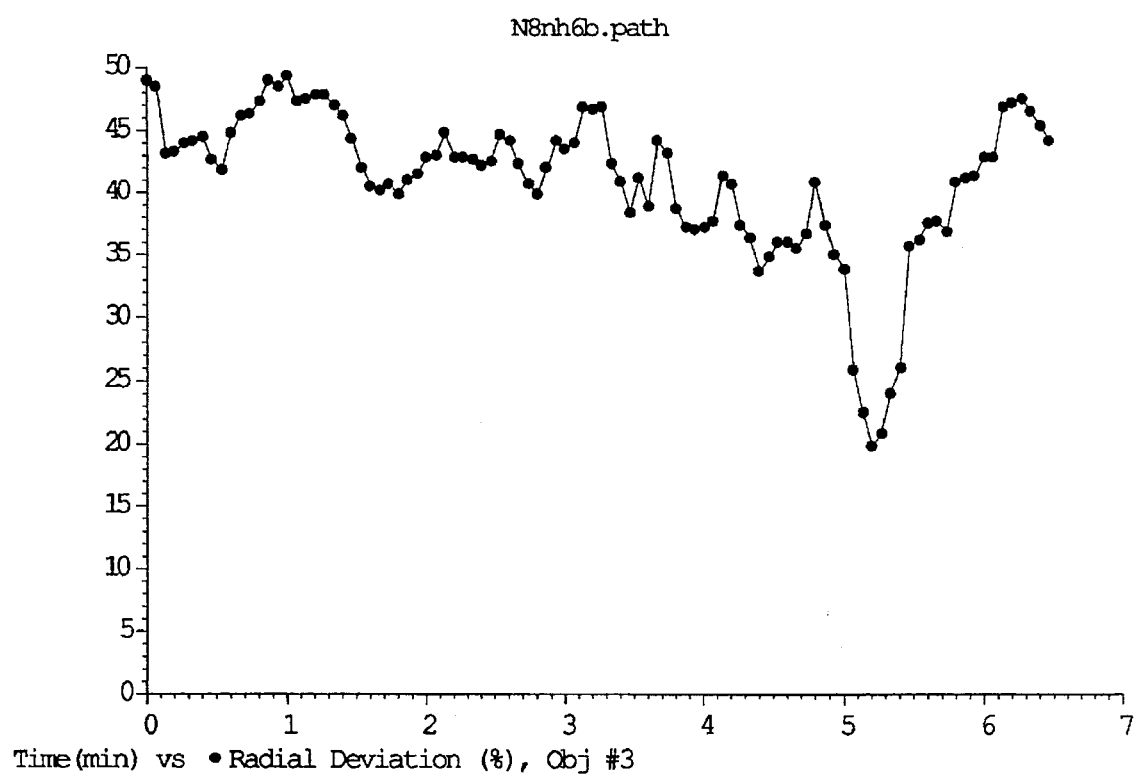
FIG. 6 illustrates a typical graphical representation of the output of the system showing a plot of the percentage radial deviation over time of the object analyzed by the system and corresponding to the data presented in Table 1.

Radial Deviation is the percent ratio of the standard deviation of the mean radial length to the mean radial length (FIG. 6).

To compute Convexity and Concavity, line segments connecting the final pixels of the mobile object's outline are drawn. The angles of turning from one segment to the next are measured with counterclockwise turning generating positive angles and clockwise turning generating negative angles. The convexity is defined to be the sum of the positive turning angles while concavity is defined to be the sum of the negative turning angles. Convexity and concavity measure the complexity of a shape.

Figure 7:
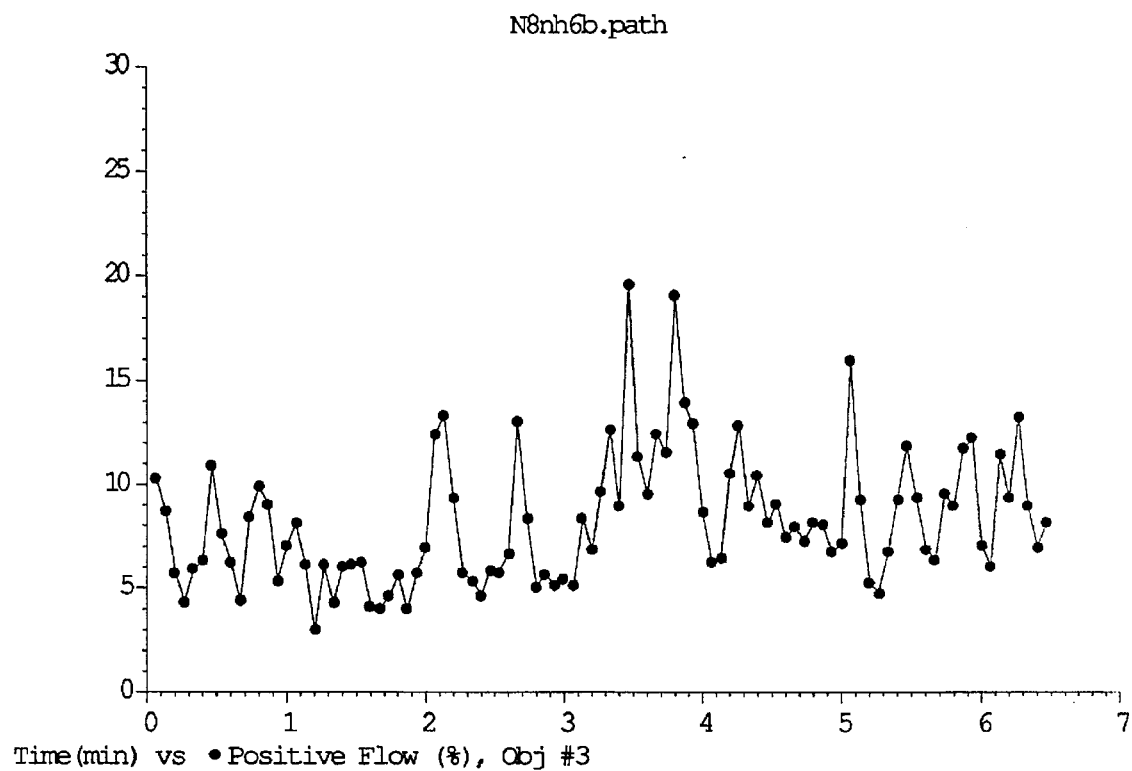
FIG. 7 illustrates a typical graphical representation of the output of the system showing a plot of percentage flow over time of the object analyzed by the system and corresponding to the data presented in Table 2.

Positive Flow is essentially the amount of new shape or area formed in a certain amount of time written as a percent of the original area (FIG. 7).

Negative Flow is essentially the amount of shape or area lost in a certain amount of time written as a percent of the original area. Positive flow and negative flow, accordingly, measure the percent amount of shape expansion and contraction, respectively (FIG. 7).

Tables 1 and 2 present data generated from a mobile object and is typical of data generated by the system.

TABLE 1

An example of tabular data

Title: NH6b Sykes Moore 731
7/2/91, Trial 1, 101 Frames, 3 Objects
Frame Rate: 15 fr/min   Scale: 0.74 um/pixel
Pixel Inc: 2  Resolution: 3  Bias: 1  Tension: 1
Centroid Method: Center of Boundary
Object 3, Frames: 1 to 98
Time: 0 to 6.46667 min, Total Elapsed Time: 6.46667 min
Total path length: 62.4172 um   Net path length: 33.5064 um
Directionality - Total: 0.536814   Upward: 0.450476   Rightward: 0.29196
Speed (um/min): 8.43641 ± 5.63075
Direction Change (deg): 0.699804 ± 0.504328
Axis Tilt (deg) : 70.1971 ± 25.5953
Maximum Length (um): 22.7285 ± 3.80599
Area (sq um): 110.641 ± 10.1407
Roundness (%): 45.1914 ± 8.8774
Radial Deviation (%): 40.9856 ± 6.00774
Positive Flow (%): 8.19485 ± 4.82991

| Object 3: Frame | Time (min) | Speed (um/min) | Dir Ch (deg) | Tilt (deg) | Length (um) | Area (sq um) | Round (%) | Rad Dev (%) |
|---|---|---|---|---|---|---|---|---|
| 1 | 0.000 | 6.931 | 0.000 | 68.846 | 28.077 | 119.233 | 36.514 | 48.944 |
| 2 | 0.067 | 9.555 | 29.993 | 70.648 | 27.250 | 115.902 | 35.088 | 48.544 |
| 3 | 0.133 | 6.283 | 25.778 | 66.829 | 26.148 | 116.681 | 35.206 | 43.238 |
| 4 | 0.200 | 1.713 | 15.806 | 67.178 | 26.123 | 116.364 | 36.353 | 43.289 |
| 5 | 0.267 | 1.373 | 10.350 | 65.955 | 25.607 | 113.118 | 35.780 | 43.987 |
| 6 | 0.333 | 3.706 | 5.284 | 62.915 | 25.254 | 117.546 | 38.890 | 44.119 |
| 7 | 0.400 | 8.651 | 4.751 | 62.915 | 25.254 | 110.293 | 36.039 | 44.513 |
| 8 | 0.467 | 8.388 | 4.726 | 63.679 | 25.852 | 123.302 | 36.589 | 42.659 |
| 9 | 0.533 | 6.715 | 22.177 | 63.050 | 25.292 | 122.250 | 40.755 | 41.843 |
| 10 | 0.600 | 2.774 | 71.002 | 63.435 | 25.966 | 117.770 | 39.831 | 44.838 |
| 11 | 0.667 | 5.127 | 84.194 | 65.021 | 25.747 | 109.559 | 38.596 | 46.096 |
| 12 | 0.733 | 9.284 | 21.205 | 63.791 | 25.954 | 111.516 | 39.342 | 46.295 |
| 13 | 0.800 | 6.639 | 28.536 | 61.786 | 27.136 | 120.005 | 40.003 | 47.311 |
| 14 | 0.867 | 7.861 | 14.121 | 63.250 | 27.781 | 119.956 | 39.044 | 49.076 |
| 15 | 0.933 | 11.962 | 18.184 | 62.109 | 26.406 | 113.200 | 41.228 | 48.532 |
| 16 | 1.000 | 18.398 | 9.795 | 64.147 | 26.630 | 115.758 | 40.534 | 49.267 |
| 17 | 1.067 | 15.873 | 0.948 | 68.596 | 27.452 | 118.861 | 38.208 | 47.372 |
| 18 | 1.133 | 6.449 | 13.161 | 71.639 | 27.829 | 120.459 | 37.612 | 47.576 |
| 19 | 1.200 | 4.015 | 15.995 | 68.018 | 26.764 | 114.435 | 38.528 | 47.765 |
| 20 | 1.267 | 4.171 | 5.510 | 68.048 | 27.606 | 120.323 | 39.193 | 47.786 |
| 21 | 1.333 | 3.195 | 14.045 | 70.056 | 27.097 | 118.816 | 39.349 | 47.020 |
| 22 | 1.400 | 1.467 | 53.554 | 67.329 | 27.070 | 120.643 | 40.371 | 46.124 |
| 23 | 1.467 | 5.444 | 2.139 | 66.784 | 25.388 | 115.486 | 40.748 | 44.258 |
| 24 | 1.533 | 9.105 | 19.154 | 68.299 | 25.076 | 118.318 | 40.281 | 42.001 |
| 25 | 1.600 | 3.812 | 12.513 | 68.426 | 24.351 | 119.553 | 40.580 | 40.572 |
| 26 | 1.667 | 2.170 | 21.327 | 69.241 | 23.989 | 123.021 | 42.333 | 40.185 |
| 27 | 1.733 | 1.961 | 38.937 | 69.302 | 24.158 | 123.155 | 39.184 | 40.638 |
| 28 | 1.800 | 3.750 | 78.747 | 70.894 | 23.909 | 126.441 | 39.206 | 39.834 |
| 29 | 1.867 | 7.928 | 44.949 | 68.676 | 24.309 | 122.330 | 39.864 | 41.066 |
| 30 | 1.933 | 11.367 | 8.712 | 69.905 | 24.851 | 120.968 | 39.629 | 41.464 |
| 31 | 2.000 | 13.465 | 23.732 | 69.945 | 24.001 | 113.523 | 40.919 | 42.762 |
| 32 | 2.067 | 16.318 | 23.622 | 70.727 | 23.659 | 118.180 | 36.784 | 42.973 |
| 33 | 2.133 | 15.143 | 1.531 | 50.611 | 25.127 | 126.072 | 36.664 | 44.764 |

TABLE 1-continued

An example of tabular data

| | | | | | | | | |
|---|---|---|---|---|---|---|---|---|
| 34 | 2.200 | 7.648 | 5.604 | 47.089 | 24.493 | 127.440 | 38.426 | 42.901 |
| 35 | 2.267 | 2.238 | 87.076 | 46.636 | 24.748 | 122.464 | 37.148 | 42.874 |
| 36 | 2.333 | 0.283 | 47.319 | 47.908 | 24.246 | 123.834 | 40.181 | 42.644 |
| 37 | 2.400 | 2.629 | 22.486 | 48.514 | 22.959 | 116.306 | 41.249 | 42.224 |
| 38 | 2.467 | 2.292 | 11.236 | 48.522 | 22.956 | 115.718 | 44.812 | 42.459 |
| 39 | 2.533 | 2.754 | 151.266 | 51.296 | 23.123 | 115.573 | 44.151 | 44.590 |
| 40 | 2.600 | 13.100 | 25.781 | 51.450 | 22.679 | 112.844 | 43.420 | 44.202 |
| 41 | 2.667 | 24.358 | 9.740 | 61.276 | 23.048 | 119.046 | 47.601 | 42.253 |

TABLE 2

More examples of tabular data.

Title: NH6b Sykes Moore 731
7/2/91, Trial 1, 101 Frames, 3 Objects
Frame Rate: 15 fr/min  Scale: 0.74 um/pixel
Pixel Inc: 2  Resolution: 3  Bias: 1  Tension: 1
Centroid Method: Center of Boundary
Object 3, Frames: 1 to 41
Time: 0 to 2.66667 min, Total Elapsed Time: 2.66667 min
Total path length: 21.1831 um  Net path length: 16.0817 um
Directionality - Total: 0.759177  Upward: 0.689677  Rightward: 0.317325
Direction (deg): 61.1876 ± 41.227
Persistence (um/min-deg): 2.05625 ± 2.7294
Central Width (um): 5.59684 ± 1.39669
Perimeter (um): 61.5354 ± 2.29001
Mean Radial Length (um): 7.60469 ± 0.32621
Mean Convexity (deg): 601.708 ± 48.9401
Positive Flow (%): 6.87149 ± 3.85549

| Object 3: Frame | Time (min) | Direct (deg) | Persis um/min-d | CenWid (um) | Peri (um) | Rad Len (um) | Convex (deg) | PosFlow (%) |
|---|---|---|---|---|---|---|---|---|
| 1 | 0.000 | 91.304 | 6.931 | 3.962 | 64.058 | 8.142 | 564.490 | NaN |
| 2 | 0.067 | 61.311 | 1.024 | 4.282 | 64.428 | 7.795 | 647.894 | 10.968 |
| 3 | 0.133 | 35.533 | 0.770 | 4.671 | 64.535 | 7.718 | 653.417 | 9.457 |
| 4 | 0.200 | 51.339 | 0.318 | 4.715 | 63.423 | 7.738 | 655.860 | 4.963 |
| 5 | 0.267 | 61.690 | 0.354 | 4.896 | 63.030 | 7.503 | 669.356 | 3.276 |
| 6 | 0.333 | 66.973 | 1.502 | 4.168 | 61.629 | 7.430 | 644.985 | 6.224 |
| 7 | 0.400 | 71.724 | 3.730 | 3.881 | 62.015 | 7.409 | 687.844 | 4.481 |
| 8 | 0.467 | 76.449 | 3.627 | 5.474 | 65.075 | 7.751 | 684.033 | 14.279 |
| 9 | 0.533 | 98.627 | 0.938 | 6.580 | 61.396 | 7.675 | 630.082 | 7.007 |
| 10 | 0.600 | 169.629 | 0.134 | 5.791 | 60.956 | 7.725 | 580.924 | 6.127 |
| 11 | 0.667 | 85.435 | 0.210 | 5.457 | 59.725 | 7.603 | 557.253 | 1.911 |
| 12 | 0.733 | 64.231 | 1.347 | 5.028 | 59.682 | 7.666 | 600.594 | 9.412 |
| 13 | 0.800 | 35.694 | 0.744 | 4.936 | 61.398 | 7.927 | 581.501 | 11.215 |
| 14 | 0.867 | 49.815 | 1.597 | 4.135 | 62.136 | 8.039 | 543.809 | 10.172 |
| 15 | 0.933 | 67.999 | 1.977 | 4.199 | 58.739 | 7.692 | 524.642 | 2.802 |
| 16 | 1.000 | 77.795 | 4.944 | 3.883 | 59.906 | 7.626 | 560.854 | 7.170 |
| 17 | 1.067 | 76.846 | 12.565 | 3.988 | 62.524 | 8.162 | 557.584 | 9.844 |
| 18 | 1.133 | 63.685 | 1.385 | 4.230 | 63.439 | 8.263 | 560.129 | 6.327 |
| 19 | 1.200 | 79.680 | 0.738 | 3.963 | 61.094 | 7.912 | 536.576 | 0.242 |
| 20 | 1.267 | 74.171 | 1.648 | 4.638 | 62.112 | 8.062 | 536.350 | 8.254 |
| 21 | 1.333 | 60.126 | 0.652 | 4.120 | 61.600 | 7.962 | 536.547 | 2.873 |
| 22 | 1.400 | 6.571 | 0.092 | 4.830 | 61.281 | 7.985 | 542.666 | 6.511 |
| 23 | 1.467 | 8.710 | 3.415 | 4.702 | 59.679 | 7.654 | 613.650 | 6.172 |
| 24 | 1.533 | 27.864 | 1.441 | 6.106 | 60.755 | 7.644 | 597.482 | 7.199 |
| 25 | 1.600 | 15.351 | 0.852 | 7.004 | 60.845 | 7.505 | 592.025 | 3.192 |
| 26 | 1.667 | 36.678 | 0.313 | 7.352 | 60.430 | 7.461 | 589.678 | 3.614 |
| 27 | 1.733 | 75.614 | 0.166 | 8.661 | 62.846 | 7.550 | 615.174 | 4.616 |
| 28 | 1.800 | 154.361 | 0.164 | 8.158 | 63.661 | 7.595 | 639.836 | 6.671 |
| 29 | 1.867 | 109.412 | 0.588 | 8.640 | 62.098 | 7.527 | 602.344 | 2.699 |
| 30 | 1.933 | 100.700 | 3.324 | 7.345 | 61.934 | 7.575 | 593.329 | 5.755 |
| 31 | 2.000 | 76.968 | 1.774 | 7.506 | 59.045 | 7.395 | 593.440 | 4.983 |
| 32 | 2.067 | 53.346 | 2.158 | 6.974 | 63.540 | 7.242 | 735.178 | 14.312 |
| 33 | 2.133 | 51.815 | 10.624 | 5.608 | 65.734 | 7.582 | 663.392 | 15.663 |
| 34 | 2.200 | 46.211 | 2.992 | 6.163 | 64.558 | 7.510 | 632.117 | 8.780 |
| 35 | 2.267 | −40.865 | 0.089 | 6.707 | 64.364 | 7.425 | 654.470 | 4.331 |
| 36 | 2.333 | −88.184 | 0.020 | 7.571 | 62.232 | 7.394 | 590.115 | 5.499 |
| 37 | 2.400 | −110.671 | 0.363 | 6.539 | 59.525 | 7.108 | 621.552 | 3.902 |
| 38 | 2.467 | −121.907 | 0.556 | 6.086 | 56.965 | 7.076 | 547.736 | 6.712 |
| 39 | 2.533 | 29.359 | 0.064 | 6.209 | 57.354 | 6.880 | 549.862 | 5.048 |
| 40 | 2.600 | 55.140 | 1.605 | 4.274 | 57.148 | 6.820 | 585.687 | 4.034 |
| 41 | 2.667 | 64.880 | 6.573 | 6.040 | 56.060 | 7.066 | 595.562 | 18.162 |

The dynamic image analysis system also includes a graphics manager which provides the user flexibility in determining the method of display of the data parameters defined above. The graphics manager provides for the display of histograms, cross plots, error bars, and does fast Fourier transforms.

The dynamic image analysis system further provides for a variety of view modes for animated synthesized images of the mobile object that has been digitized and analyzed by the system. The view modes which can be selected include a mode in which the shapes of all mobile objects in the frame of the television image are displayed on the computer monitor. The color, resolution, and size of the shapes may be selected and modified by the user. The complete paths of all mobile objects in the frame can also be displayed. The appearance of a displayed path is unaffected by the current frame being viewed on the monitor. The colors, time intervals, and size of the paths may be modified by the user.

The dynamic image analysis system also includes a data-graphing manager which provides flexibility in displaying the various parameters discussed above or defined by the user. It displays regular plots, histograms, 2D and 3D crossplots. It allows the user to choose a custom Tukey window for smoothing. It supports convolution, correlation and Fourier transforms. Minima and maxima are computed. Linear and quadratic regression are supported. It also allows the import and export of data from other Macintosh applications via the clipboard.

The dynamic image analysis system further provides for holistic viewing of shape information spanning the entire range of frames digitized. This allows the human eye to see patterns in ways that simple tables of numbers cannot. The user makes selections from four independent categories to create such a depiction: (1) color and outline, (2) parameter: actual shape, curvature, or flow, (3) degree of differencing, if any, and (4) view mode of either tabular, graphs, or linear or circular wrapping. These choices give the user over 60 different ways of viewing the object(s) during translocation. Also animations of stacking and differencing may be created. Animations may be saved as 'movies' and played back either alone or in simultaneous 'montage' mode.

Figure 10:
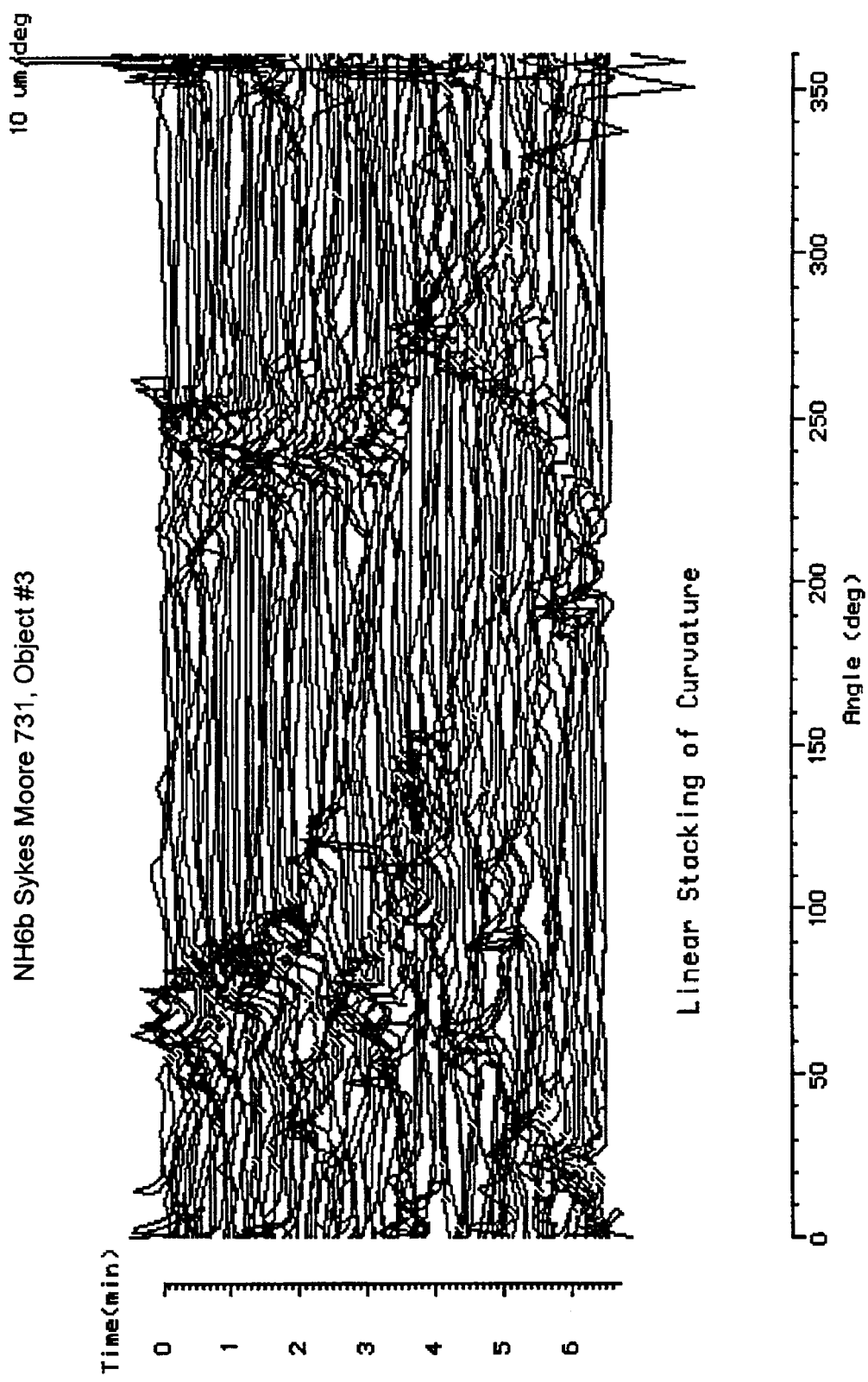
FIG. 10 illustrates a typical graphical representation of the output of the system, specifically a graphical representation of linear stacking of curvature of the object analyzed by the system and corresponding to data presented in the Tables 1 and 2.
Figure 11:
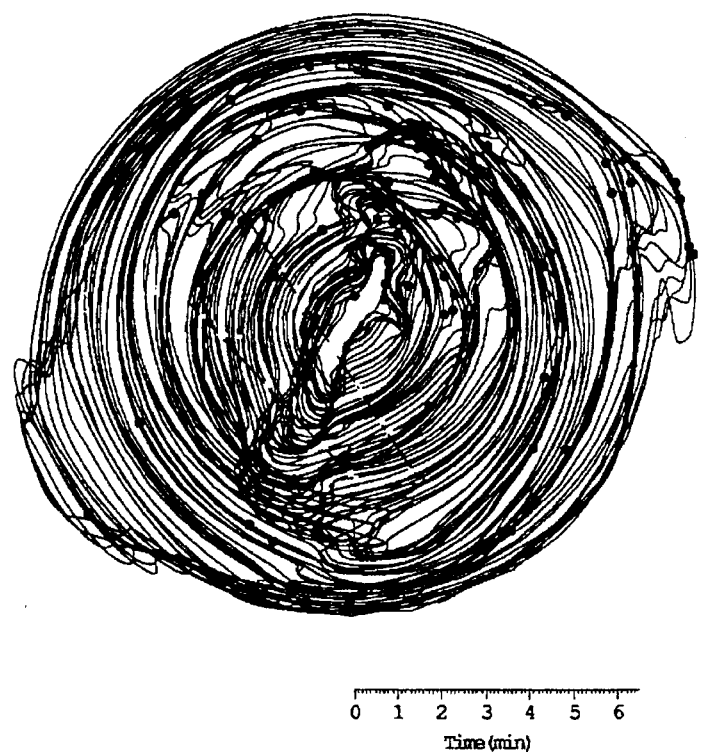
FIG. 11 illustrates a typical graphical representation of the output of the system, specifically a graphical representation of the circular stacking of contours of the object analyzed by the system and corresponding to data presented in the Tables 1 and 2.

The images of the shape of the mobile object may be unwrapped either by angle or by boundary length and plotted in one window each one offset lower than the last. Linear stacking of the shape of the mobile object described in Tables 1 and 2 unwrapped by angle is represented in FIG. 10. The shapes may also be stacked in one window with the centroids centered at the center of the window and the scale expanded at a constant rate, frame by frame, as represented in FIG. 11 for the mobile object described in Tables 1 and 2.

Figure 12:
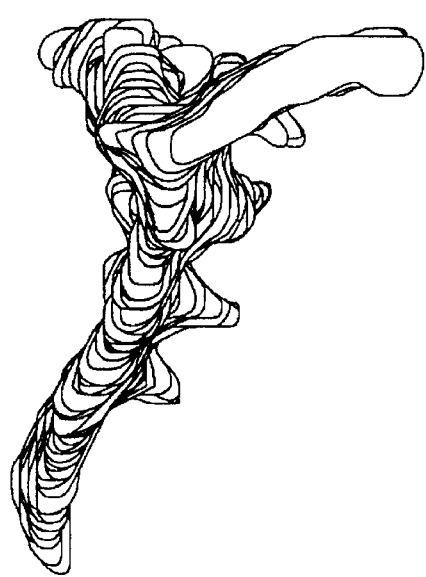
FIG. 12 illustrates a typical graphical representation of the output of the system showing the contour of an object analyzed by the system over time wherein successive images are stacked over earlier images.

Another view mode stacks the images of the shape of the mobile object so that the shape of the mobile object in the current frame is not erased when another frame is selected for viewing. FIG. 12 is an example of a stacked image display of a cell tracked over a plurality of frames.

Figures 8A, 8B, 8C:
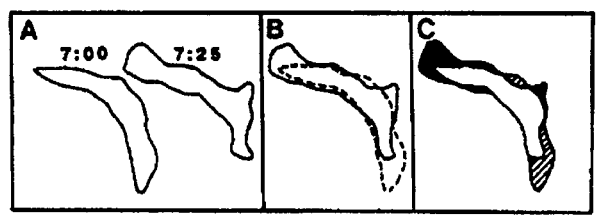
Figure 9:
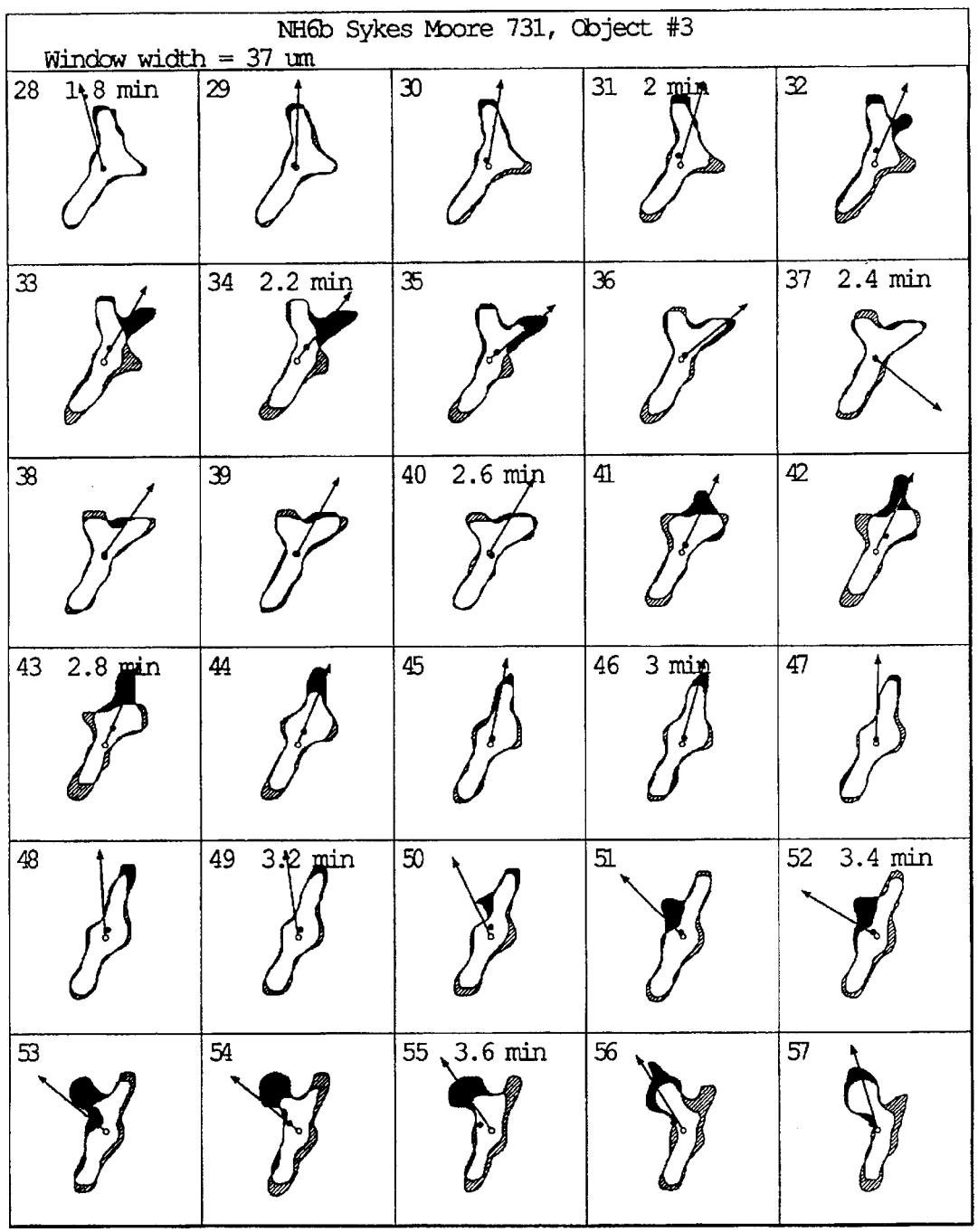
FIG. 9 illustrates a typical representation of the output of the system showing a succession of difference images of a mobile cell including an arrow indicating the direction of motion of the centroid of the cell.

When the difference image view mode is selected, the shape of an object in the current frame is superimposed on its shape from the previous frame. The portions of the shape of the previous frame not covered by the shape of the current frame is shown in a first selected color and portions of the shape of the current frame not covering the shape of the previous frame are shown in an alternative color. Portions common to both are shown in a third color. FIGS. 8 and 9 are examples of difference images representing the changes in a mobile cell over single (FIG. 8) and multiple (FIG. 9) intervals. The center open circle depicted in FIG. 9 is the centroid of the cell and the arrow is its directionality.

Although the invention has been described with respect to a preferred embodiment thereof, it is to be also understood that it is not to be so limited since changes and modifications can be made therein which are within the full intended scope of this invention as defined by the appended claims.

We claim:

1. Apparatus for analyzing motility and dynamic morphology of digital representations of the periphery of a mobile object, comprising:

(a) means for storing each of the digital representations;

(b) a digital processor for processing the digital representations;

(c) a digital computer operable to carry out a set of software commands, wherein said software commands are used to (i) generate a plurality of parameters of shape, changes in shape, and motion of the mobile object between successive images, (ii) provide image processing of the digital representations, and (iii) generate synthesized graphical representations and animations of the mobile object;

(d) wherein said software commands are used to adjust the display of the animations and the periphery of the mobile objects in the animations, by allowing a user to select from a group of four independent display options including (i) color and outline of the animations and the periphery of mobile objects in the animations, (ii) actual shape, curvature or flow of mobile objects in the animations, (iii) degree of differencing, and (iv) a view mode of either tabular, graphical, linear wrapping or circular wrapping; and (e) means for displaying said graphical representations and animations.

2. Apparatus for analyzing motility and dynamic morphology of digital representations of the periphery of images of a mobile object, comprising:

(a) means for storing each of the digital representations;

(b) a digital processor for processing the digital representations;

(c) a digital computer operable to carry out a set of software commands, wherein said software commands are used to (i) generate a plurality of parameters of shape, changes in shape, and motion of the mobile object between successive images, (ii) provide image processing of the digital representations, and (iii) generate synthesized graphical representations and animations of the mobile object;

(d) wherein said software commands are used to generate graphical representations of the mobile objects, wherein the graphical representations are stacked images from successive frames of the periphery of the mobile object wherein the centroids of the images of the mobile object from successive frames are stacked on the same center point and the scale of the display is expanded at a constant rate; and (e) means for displaying said graphical representations and animations.

3. Apparatus for analyzing motility and dynamic morphology of digital representations of the periphery of images of a mobile object, comprising:

(a) means for storing each of the digital representations;

(b) a digital processor for processing the digital representations;

(c) a digital computer operable to carry out a set of software commands, wherein said software commands are used to (i) generate a plurality of parameters of shape, changes in shape, and motion of the mobile object between successive images, (ii) provide image processing of the digital representations, and (iii) generate synthesized graphical representations and animations of the mobile object;

(d) wherein said software commands are used to generate graphical representations of the mobile objects, wherein the graphical representations are images taken from two successive frames of the periphery of the mobile object wherein a first color is used for displaying the area common to both peripheries, a second color is used for the area inside the periphery from the first image but outside the periphery of the second image, and a third color is used for the area inside the periphery from the second image but outside the periphery of the first image; and (e) means for displaying said graphical representations and animations.

* * * * *